United States Patent
Horvath et al.

(10) Patent No.: US 10,454,302 B2
(45) Date of Patent: Oct. 22, 2019

(54) POWER SOURCE ADJUSTMENT

(71) Applicant: HEWLETT PACKARD ENTERPRISE DEVELOPMENT LP, Houston, TX (US)

(72) Inventors: Stephen Horvath, Roseville, CA (US); Eric Pelletier, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 186 days.

(21) Appl. No.: 15/522,771

(22) PCT Filed: Oct. 31, 2014

(86) PCT No.: PCT/US2014/063289
§ 371 (c)(1),
(2) Date: Apr. 28, 2017

(87) PCT Pub. No.: WO2016/068964
PCT Pub. Date: May 6, 2016

(65) Prior Publication Data
US 2017/0324275 A1    Nov. 9, 2017

(51) Int. Cl.
| | |
|---|---|
| *G06F 1/00* | (2006.01) |
| *H02J 13/00* | (2006.01) |
| *H02J 3/38* | (2006.01) |
| *H01M 10/44* | (2006.01) |

(Continued)

(52) U.S. Cl.
CPC ....... *H02J 13/0062* (2013.01); *H01M 10/443* (2013.01); *H02J 3/38* (2013.01); *H02J 3/40* (2013.01); *H02J 7/00* (2013.01)

(58) Field of Classification Search
CPC .. H02J 13/0062; H02J 3/40; H02J 3/38; H02J 7/00; H01M 10/443
See application file for complete search history.

(56) References Cited

U.S. PATENT DOCUMENTS

| | | |
|---|---|---|
| 8,536,842 B2 | 9/2013 | Prodi et al. |
| 8,730,695 B1 | 5/2014 | Ludlam et al. |
| 2008/0253794 A1 | 10/2008 | Nillesen |

(Continued)

FOREIGN PATENT DOCUMENTS

| | | |
|---|---|---|
| CN | 202340191 U | 7/2012 |
| JP | 2010220280 A | 9/2010 |
| WO | WO-2013185661 A1 | 12/2013 |

OTHER PUBLICATIONS

International Search Report and Written Opinion, International Application No. PCT/US2014/063289, dated Jun. 30, 2015, pp. 1-9, KIPO.

(Continued)

*Primary Examiner* — Xuxing Chen
(74) *Attorney, Agent, or Firm* — Hewlett Packard Enterprise Patent Department

(57) ABSTRACT

Examples of power source adjustment can include a device that includes a sensing device to measure a first thermal temperature of a first power source and second thermal temperature of a second power source, a controller to balance power sourced by each of the first and the second power sources based on the first and the second thermal temperatures, and a circuit to adjust the power sourced by each of the first and the second power sources based on the balanced sourced power.

16 Claims, 5 Drawing Sheets

(51) Int. Cl.
*H02J 3/40* (2006.01)
*H02J 7/00* (2006.01)

(56) References Cited

U.S. PATENT DOCUMENTS

| | | |
|---|---|---|
| 2011/0025292 A1 | 2/2011 | Huang et al. |
| 2012/0218707 A1* | 8/2012 | Chan .................. H05K 7/20518 361/679.48 |
| 2013/0076381 A1 | 3/2013 | Takayanagi et al. |
| 2014/0208716 A1* | 7/2014 | McCoy ............... F02D 41/1439 60/274 |
| 2014/0254218 A1 | 9/2014 | Santini et al. |
| 2014/0319128 A1 | 10/2014 | Paull |
| 2014/0368059 A1* | 12/2014 | Sugawara ............. H01F 27/402 307/117 |
| 2015/0076910 A1* | 3/2015 | Wang .................... H02M 3/156 307/52 |
| 2015/0177805 A1* | 6/2015 | Yeh ........................ G06F 1/263 713/300 |

OTHER PUBLICATIONS

Wenkang Huang et al., "Inductors Allow Loss-Less Current Sensing in Multiphase DC-DC Converters," PCIM, Jun. 2001, pp. 58-67, Available at: <powerelectronics.com/site-files/powerelectronics.com/files/archive/powerelectronics.com/mag/Loss-Less Current Sensing.pdf>.

* cited by examiner

POWER SOURCE ADJUSTMENT

BACKGROUND

Power sources, also known as power supplies, are electronic devices that supply electric energy to an electrical load. To allow for failover and/or to give a system increased capacity, more than one power source may be utilized in the system or a network. These power sources are wired in series or in parallel, among other connections.

DETAILED DESCRIPTION

Power sources operating in parallel and delivering symmetrical power to loads may not have equal and symmetrical thermal stress. As used herein, thermal stress can include stress to a power source caused by temperature changes, for instance, caused by a change in air flowing to the power source and/or condition changes (e.g., power drawn) in the power source, among others. For example, air drawn into different power sources may result in some power sources receiving hotter air than others. A first power source receiving hotter air than a second power source may have a smaller margin of reliability (also known as a power margin) and/or a lower power capacity. In other words, the amount of power the first power source can deliver is reduced. Unequal hot air between power supplies that normally share a load can reduce a power capacity of an entire system, in some instances. As used herein, a power margin can include an acceptable (e.g., safe, desired, etc.) range of power that may be sourced by a power source. As used herein, a power capacity can include an amount of power available to be sourced by a power source.

For example, a power source system, which can include a network of electrical components used to supply, transmit, and use electric power, may be designed to a worst-case scenario for any one of the power sources in the system. This may imply that not all power sources in the system are operating at their worst case condition, leaving an unused power margin in some power sources, while other power sources are operating at the limit of their safety power margin. This design may result in over-designed power solutions to account for an additional power margin. In some instances, components within a power source (e.g., MOSFETs, FETs, transformers, magnetic sources, diodes, etc.) may have critical temperatures that require a particular power margin to properly perform. By adjusting a balance of power between power sources in accordance with the present disclosure, desired power margins in power sources and a power source system may be achieved.

Additionally, variation in environmental heating and/or temperature of the system, and/or variation in heating and/or temperature between the power sources may cause an uneven amount of heating and thermal stress on components internal to the sources, from source to source. Power source adjustment in accordance with the present disclosure can include shifting power delivered by each power source such that thermal stress is equivalent between parallel power sources, rather than having equal power delivered to each power source.

Figure 1:
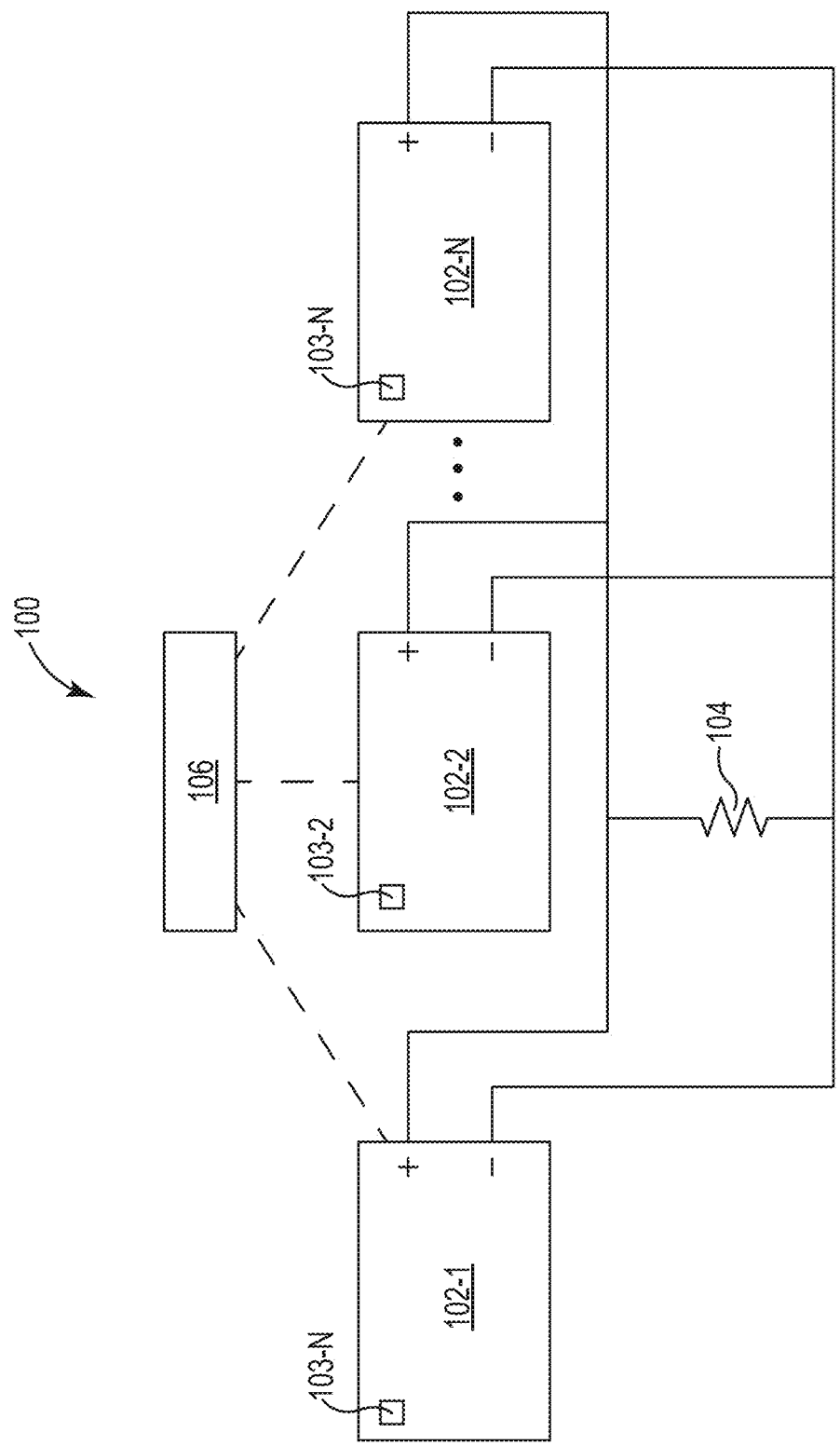
FIG. 1 illustrates an example of a system according to the present disclosure.

FIG. 1 illustrates an example of a system 100 according to the present disclosure. System 100 can include an active current sharing system or a droop-based current sharing system, among others. FIG. 1 includes a plurality of power sources 102-1, 102-2, . . . , 102-N wired in parallel and actively providing power to a load 104 simultaneously. The plurality of power sources 102-1, 102-2, . . . , 102-N can be in communication with a controller 106, for instance, by sending to and receiving from controller 106 a plurality of signals.

Power source adjustment in accordance with the present disclosure can include balancing an amount of power that is sourced between, for instance, the plurality of power sources 102-1, 102-2, . . . , 102-N. For example, if power source 102-1 experiences an increased internal temperature change due to higher inlet, exhaust, or internal component temperature, an amount of power sourced from power source 102-1 can be dynamically shifted toward other power sources within system 100 under less thermal stress. As used herein, dynamically can include variable and/or constantly changing in response to a particular influence (e.g., balancing power sourced in response to a change in thermal stress on a power source). This dynamic shift can result in a power source with a lower temperature taking on more of the power capacity of the system as compared to a power source with the higher temperature.

Some approaches to operating a system with power sources wired in parallel include two or more power sources providing power to a load simultaneously and in parallel with a goal of balancing the amount of power sourced from each power source to be as equal as possible. However, in such parallel sharing scenarios, even though the amount of power being sourced is equal, the thermal temperature rise of equivalent electronic components internal to each power source may not be equal. Causes of unequal thermal stress can be attributed to a number of effects, including, for instance, different inlet air temperatures between power sources, variations in electronic components, and environmental variations in the physical location of the power sources.

In contrast, power source adjustment in accordance with the present disclosure can balance thermal stress on each power source (e.g., power sources 102-1, 102-2, . . . , 102-N) rather than balancing the power delivered by each power source. This can result in a more reliable system (e.g., system 100) with a lower failure rate as compared to other approaches. Additionally, power source adjustment in accordance with the present disclosure can result in an increased power capacity of the system and/or a greater power margin for the system. The higher the power margin, the greater the reliability of the system and the lower probability of failure of the system.

Examples of the present disclosure can include elements working together to balance sourced power within system 100. For instance, power source adjustment in accordance with the present disclosure can include a number of thermal temperature sensing devices (not shown in FIG. 1) present in a power source at the air inlet, air exhaust, and/or any electronic component or heat sink that may be sensitive to thermal stress or high temperature. A sensor may also be present in a power source to measure an amount of power sourced by the power source. A corresponding signal from each sensor can report the measured signal, for instance to controller 106.

Controller 106 can include a control system, a microcontroller, or analog/logic circuit, among others, that receives sensing signals from the sensing devices and acts correspondingly on the power sources 102-1, 102-2, . . . , 102-N to balance the power sourced by each power source 102-1, 102-2, . . . , 102-N. Controller 106, as will be discussed further herein, can generate a linear response signal for each power source 102-1, 102-2, . . . , 102-N that is proportional to the amount of power that power source sources, relative to the other power sources. For example, controller 106 can receive inputs from the power sources and determine what to drive back out of the system in response. Controller 106 can measure an imbalance in stress on the power supply and drive back adjustments. As will be discussed further herein with respect to FIGS. 2 and 3, a thermal steering signal or droop shift signal can be sent to a power supply in response to the controller determining an imbalance in thermal stress, temperature, and/or component stress margin, among others, between power sources.

Further, power source adjustment in accordance with the present disclosure can include a mechanism 103-1, 103-2, . . . , 103-N, such as a circuit, that raises or lowers the power sourced by a power source based on input from the controller. In some examples, this mechanism 103-1, 103-2, . . . , 103-N can be internal to the power sources 102-1, 102-2, . . . , 102-N. Power source adjustment in accordance with the present disclosure can also include controlling a balance of power sourced by the power sources 102-1, 102-2, . . . , 102-N using droop current sharing and/or active current sharing, for instance.

Power source adjustment in accordance with the present disclosure can be more reliable and have a lower cost as compared to other approaches. Additionally, power source adjustment in accordance with the present disclosure can result in lower thermal stress on power sources, higher total power capacity within power sources and systems, and may require a decreased volume in total solution for power sources as compared to other approaches. In some instances, power supply can be reduced, offsetting capacity and reliability. In such an example, net capacity and reliability may be the same as in other approaches, but the power supply is smaller, thus having lower costs and lower thermal stress, among others.

Figure 2:
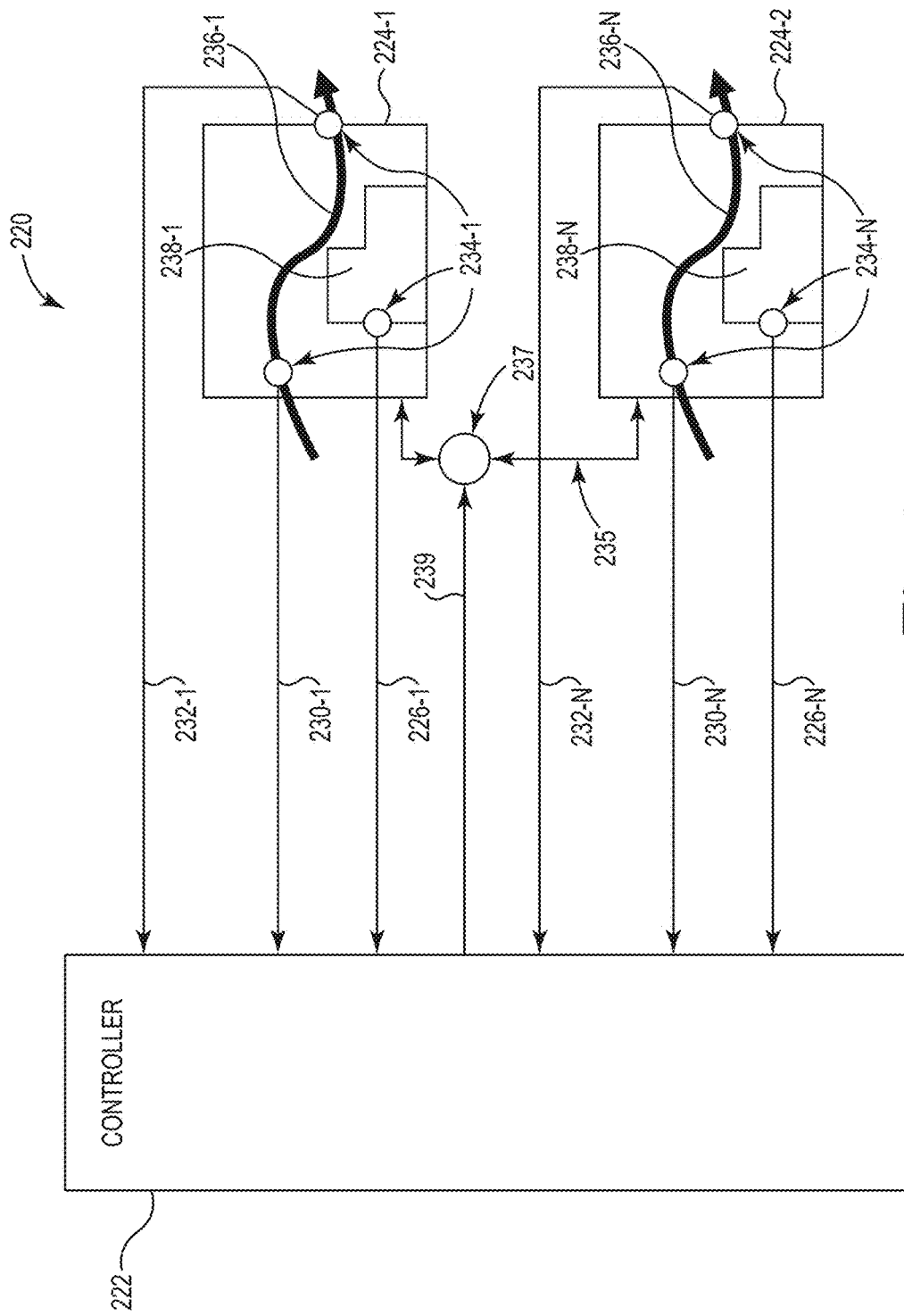
FIG. 2 illustrates a diagram of an example of an environment for power source adjustment according to the present disclosure.
Figure 3:
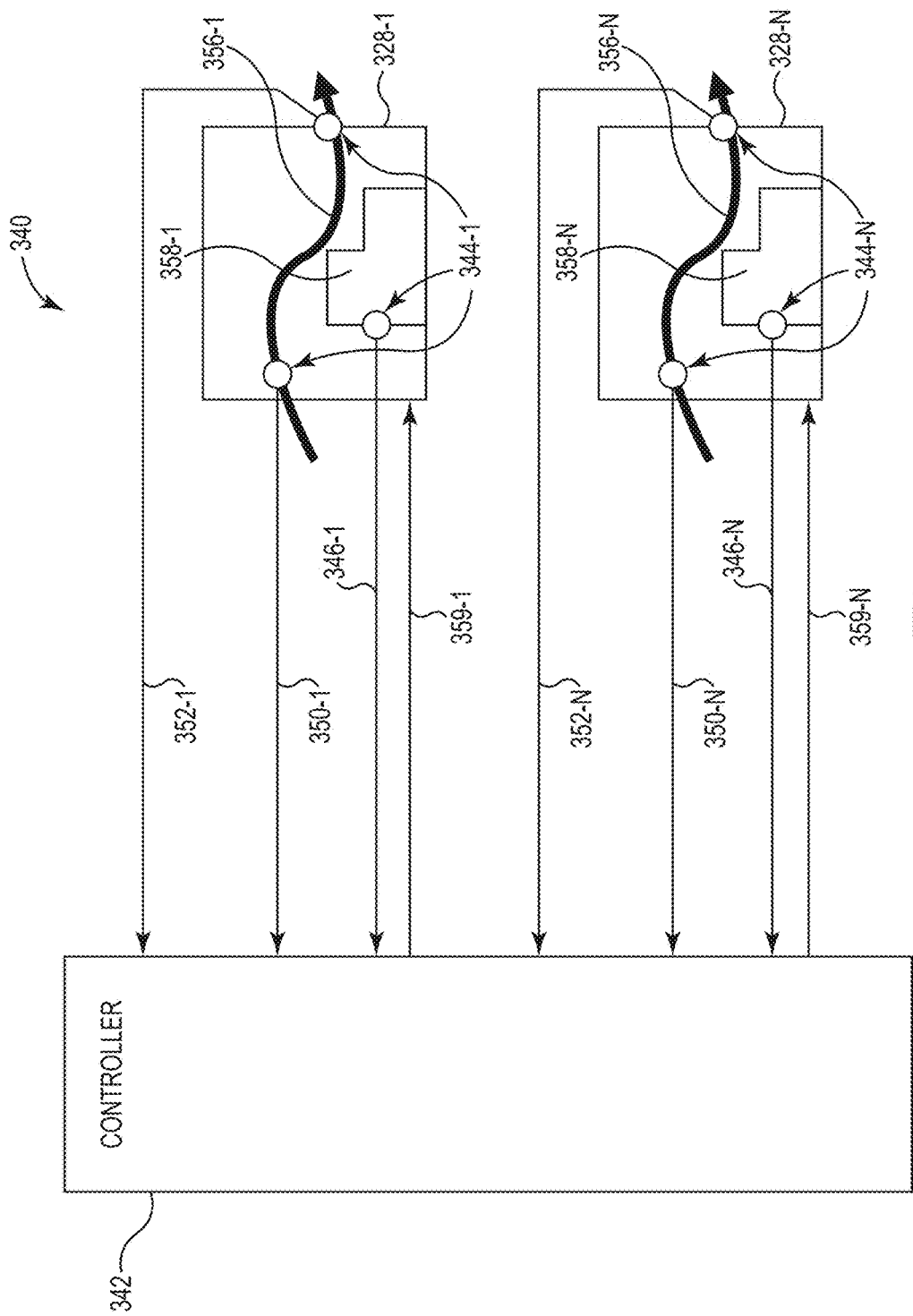
FIG. 3 illustrates a diagram of an example of an environment for power source adjustment according to the present disclosure.

FIG. 2 illustrates a diagram of an example of an environment 220 for power source adjustment according to the present disclosure. FIG. 2 illustrates an example of power source adjustment among active current sharing power sources. FIG. 3 is a diagram of an example of an environment 340 for power source adjustment according to the present disclosure. FIG. 3 illustrates an example of power source adjustment among droop-based current sharing power sources.

FIGS. 2 and 3 will be discussed together herein. Environments 220 and 340 can include components to dynamically adjust a balance of current (or power) delivered from individual power sources such that thermal stress is approximately equivalent on each power source, which can result in more power being safely delivered to the loads, increasing the total delivered capacity of the power system. As will be discussed further herein, to do so a degree to which each power source is thermally stressed can be determined. As used herein, "approximately" can include a distance within a particular margin, range, and/or threshold.

FIG. 2 illustrates power sources 224-1 and 224-N wired in parallel, and similarly, FIG. 3 illustrates power sources 328-1 and 328-N wired in parallel. However, while FIGS. 2 and 3 each illustrate two power sources, the present disclosure is not limited to two power sources. Power sources 224-1, 224-N, 328-1, and 328-N can include components (e.g., "hot" components) 238-1, 238-N, 358-1, and 358-N, respectively. These components may produce and/or generate heat and can include, for instance, a transformer, a metal-oxide-semiconductor field-effect transistor (MOSFET), a transistor, a diode, a diode bridge, an inductor, and/or a choke, among others.

Power sources 224-1, 224-N, 328-1, and 328-N can have air flowing through them, for example, as illustrated at 236-1, 236-N, 356-1, and 356-N, respectively. This air can be of different temperatures due in part, for instance, to temperatures of components over which the air has flown and/or variation in an inlet temperature between power sources. Power sources 224-1, 224-N, 328-1, and 328-N can also include sensors (e.g., thermal sensors, temperatures sensors, etc.) 234-1, 234-N, 344-1, and 344-N, respectively. These sensors, as will be discussed further herein can measure temperatures of the aforementioned components 238-1, 238-N, 358-1, and 358-N, along with temperatures of air entering and/or exiting power sources 224-1, 224-N, 328-1, and 328-N. Additionally, sensors 234-1, 234-N, 344-1, and 344-N can measure temperatures of heat sinks within power sources 224-1, 224-N, 328-1, and 328-N, and an amount of power being sourced by each of power sources 224-1, 224-N, 328-1, and 328-N.

In response to these measurements, power sources 224-1, 224-N, 328-1, and 328-N can output signals to a controller 222, 342 for use in power source adjustment. For instance, power sources 224-1 and 224-N can output to controller 222 exhaust temperature signals 232-1 and 232-N inlet temperature signals 230-1 and 230-N (e.g., ambient inlet temperature signals), respectively, and component (e.g., hot component) temperature signals 226-1 and 226-N, among others. Power sources 328-1 and 328-N can output to controller 342 exhaust temperature signals 352-1 and 352-N inlet temperature signals 350-1 and 350-N (e.g., ambient inlet temperature signals), respectively, and component (e.g., hot component) temperature signals 346-1 and 346-N, among others.

Using these signals, a thermal stress on each power source 224-1, 224-N, 328-1 and 328-N can be sensed at sensors 234-1, 234-N, 344-1, and 344-N. In some examples, the ambient or inlet temperature entering the power sources can be measured. For example, sensor(s) 234-1 can measure ambient/inlet signal 230-1. Sensor(s) 234-N can do the same for signal 230-N, while sensor(s) 344-1 and 344-N can do so for signals 350-1 and 350-N. In such an example, using the Arrhenius equation, it may be determined that a higher ambient temperature can lead to an exponentially escalated failure rate of electronic components. Ambient temperature can be used to measure stress on a power source, in correlation with an amount of stress associated with the ambient temperature, for instance.

In another example, an exhaust temperature of each of the power sources 224-1, 224-N, 328-1, and 328-N can be measured. For example, sensor(s) 234-1 can measure exhaust signal 232-1. Sensor(s) 234-N can do the same for signal 232-N, while sensor(s) 344-1 and 344-2 can do so for signals 352-1 and 352-N. In some instances, this can yield a closer approximation to the actual amount of heating associated with each power source as compared to using an ambient/inlet temperature signal.

In another example, a hottest component temperature of each of the power sources 224-1, 224-N, 328-1, and 328-N can be measured. For example, sensor(s) 234-1 can measure hot component temperature signal 226-1. Sensor(s) 234-N can do the same for signal 226-N, while sensor(s) 344-1 and 344-2 can do so for signals 346-1 and 346-N. In some examples, a temperature of one component may be measured, for instance a "critical component". In other examples, temperatures of more than one component (e.g., more than one "critical" component) can be measured. As used herein, a critical component can include a component necessary for the system to function properly; for instance, loss of function of the critical component may cause system failure. Temperatures produced by heat sinks within power sources 224-1, 224-N, 328-1, and 328-N can also be measured in some examples.

An amount of power sourced by each of the power sources 224-1, 224-N, 328-1, and 328-N can be measured in some instances. For example, a current drawn by each of the power sources 224-1, 224-N, 328-1, and 328-N can be measured if power source voltages are fixed. In a number of examples, a combination of two or more of the inlet/ambient temperature, exhaust temperature, heat sink temperature, component(s) temperature, and/or power sourced can be measured for use in power source adjustment.

Sensors 235-1, 234-N, 344-1, and 344-N may be the same sensor for measuring thermal stress, ambient/inlet temperature, exhaust temperature, etc., or sensors 235-1, 234-N, 344-1, and 344-N may be different for each measurement. For instance, a first sensor can measure thermal stress, a second (different) sensor can measure ambient/inlet temperature, and a third (also different) sensor can measure exhaust temperature, among other sensors for other measurements.

Controllers 222 and 242 can include, in some examples, a micro controller or an ASIC, among others. Controllers 222 and 342 can be individual controllers or a plurality of controllers acting in unison. Controllers 222 and 342 can receive a temperature or thermal stress measurement measured from the ambient/inlet signals, exhaust temperature signals, heat sink signals, component temperature signals, and/or amounts of power sourced and drive an actuator in the power sources to balance the power. If, for example, power sources 224-1 and 224-N or 328-1 and 328-N have equal thermal stress measured, then the driving signal(s) from controllers 222, 342 may also be equal. If, however, one power source shows greater thermal stress than the other, the source with less thermal stress can have its drive signal increased. In response, the thermal stress may decrease in the worse power source until the power sources have equivalent thermal stress.

In such an example, a control loop may have a relatively slow response time, such that oscillations and instability in the control loop do not interact with other control loops in the power system (e.g., environment 220 and/or 340). There may also be a maximum amount of imbalance (e.g., a threshold imbalance) in power designed into the system, such that one power source does not source all the power, which may cause other design limits to be exceeded.

In an example, an actuator within the power source may set an amount of imbalance between parallel power sources. Power source adjustment according the present disclosure can include adjustment in both active current sharing systems and/or droop-based current sharing systems. Examples of the present disclosure can drive an imbalance in power delivered for both power sharing approaches.

Power sources 236-1 and 236-N, as illustrated in FIG. 2, can actively share current, for instance, via a sharing bus offset generator 237. In response to controller 222 determining an imbalance in power between power sources 224-1 and 224-N, a thermal steering signal 239 can be sent by controller 222 instructing how to balance the power sourced by each of power source 224-1 and power source 224-N. For instance, if power source 224-1 has more thermal stress than power source 224-N, power source 224-N may source an increased amount of power.

Some approaches to active sharing in a parallel power source system include the use of a bidirectional signal bus routed to all power sources, such that all power sources have the same potential on this sharing bus. In such approaches, the output power is proportional to the voltage on this bus, and the power sources deliver equal amounts of power. In contrast, power source adjustment in accordance with the present disclosure includes an offset potential applied to each power source such that they actively share input, while still maintaining a shared base voltage. In this way (e.g., using the generator 237), a sharing voltage bus used in active sharing may have a different potential for each power source, and that difference can be controlled to determine an imbalance between each power source.

Power sources 328-1 and 328-N, as illustrated in FIG. 3, can share current via a droop shift. For example, power supplies operating in parallel may design and/or exhibit a droop curve, as will be further discussed with respect to FIG. 4. As more power is pulled by a power source, voltage droops, or drops proportionally to the current. When wired in parallel, power sources may balance power between one another, such that they balance their power output equally by nature of the droop.

Power source adjustment in accordance with the present disclosure can include shifting a droop curve up or down by a controlled amount (e.g., for each power source independently) to rebalance a distribution of power delivered by power supplies wired in parallel. For instance, a power source with a droop curve shifted up (e.g., from 464 to 462 as will be discussed further herein with respect to FIG. 4) may begin to source more power when in parallel with another power supply that maintains a droop curve (e.g., curve 464 of FIG. 4). The power sources may still share the load, but the proportion is shifted, for instance. If the load changes, the proportion of power sourced from each power source can stay the same, which can result in a desired balance of sourced power between the power supplies. In this way, the output power of each power source can be individually controlled while still maintaining a proportional amount of output power delivered from each power source.

As illustrated in FIG. 3, droop offset signals 359-1 and 359-N can be sent to power sources 328-1 and 328-N in response to controller 342 detecting an imbalance in power sourced between power sources 328-1 and 328-N. These signals 359-1 and 359-N can result in a determination made (e.g., by controller 342) to shift droop curves to re-balance a proportion of power sourced by each power source 328-1 and 328-N, for instance.

Figure 4:
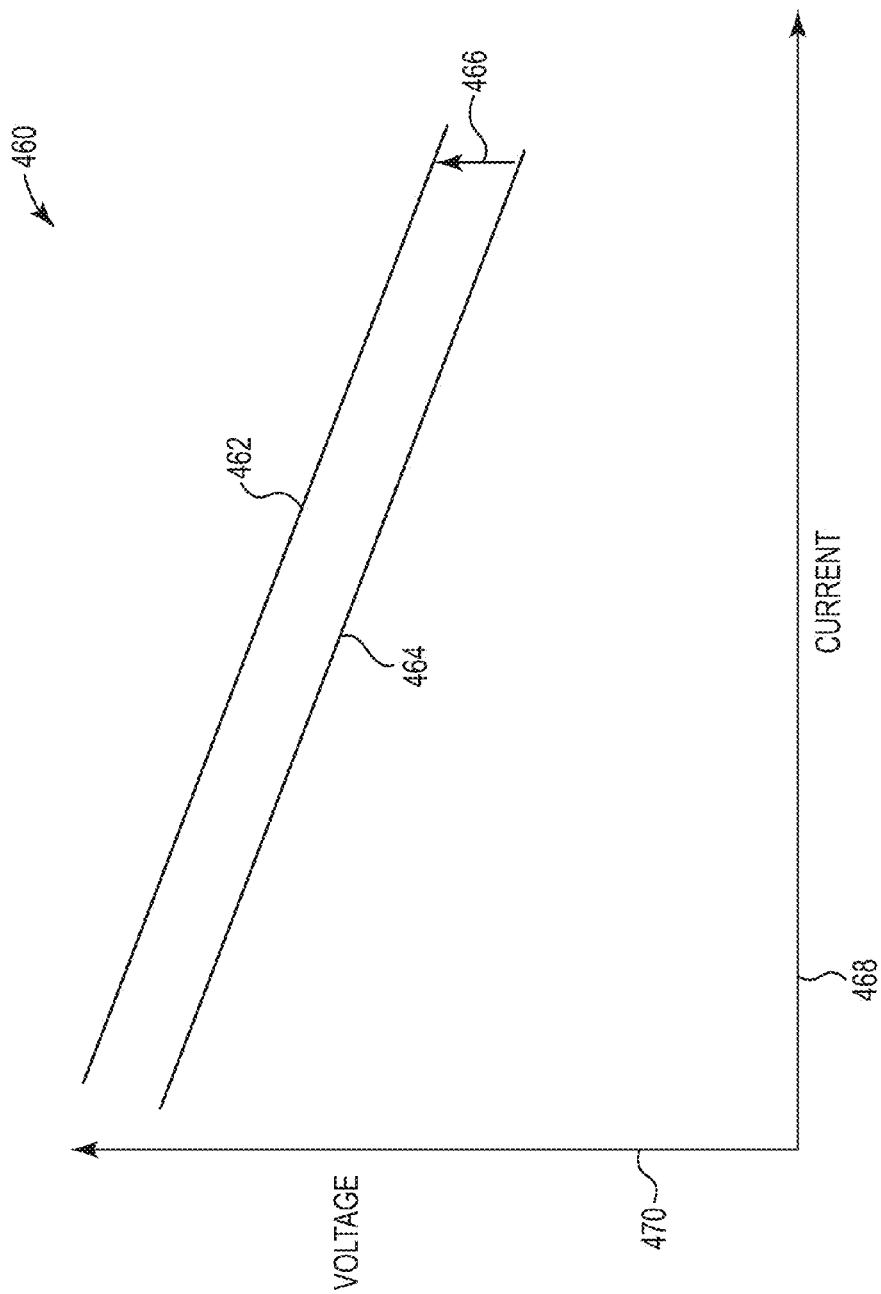
FIG. 4 illustrates a diagram of a shifted droop shift curve according to the present disclosure.

FIG. 4 illustrates a diagram 460 of a shifted droop shift curve 462 according to the present disclosure. The x-axis 468 associated with droop shift curve 462 represents current associated with a power source, while the y-axis 470 represents voltages associated with the power source. Curve 464 can be a droop curve representing a voltage-current relationship of output for a droop-based power source, while curve 462 can represent a droop curve shifted with positive shift. The amount of the shift 466 can be determined by the voltages on the droop shift signal, for example. Curve 462, in an example, may be shifted upward to rebalance a power supply to a first power source; for instance, it may be desired for the first power source to have more sourced power than a different power source in response to the first power source having a lower thermal stress than the different power source.

Figure 5:
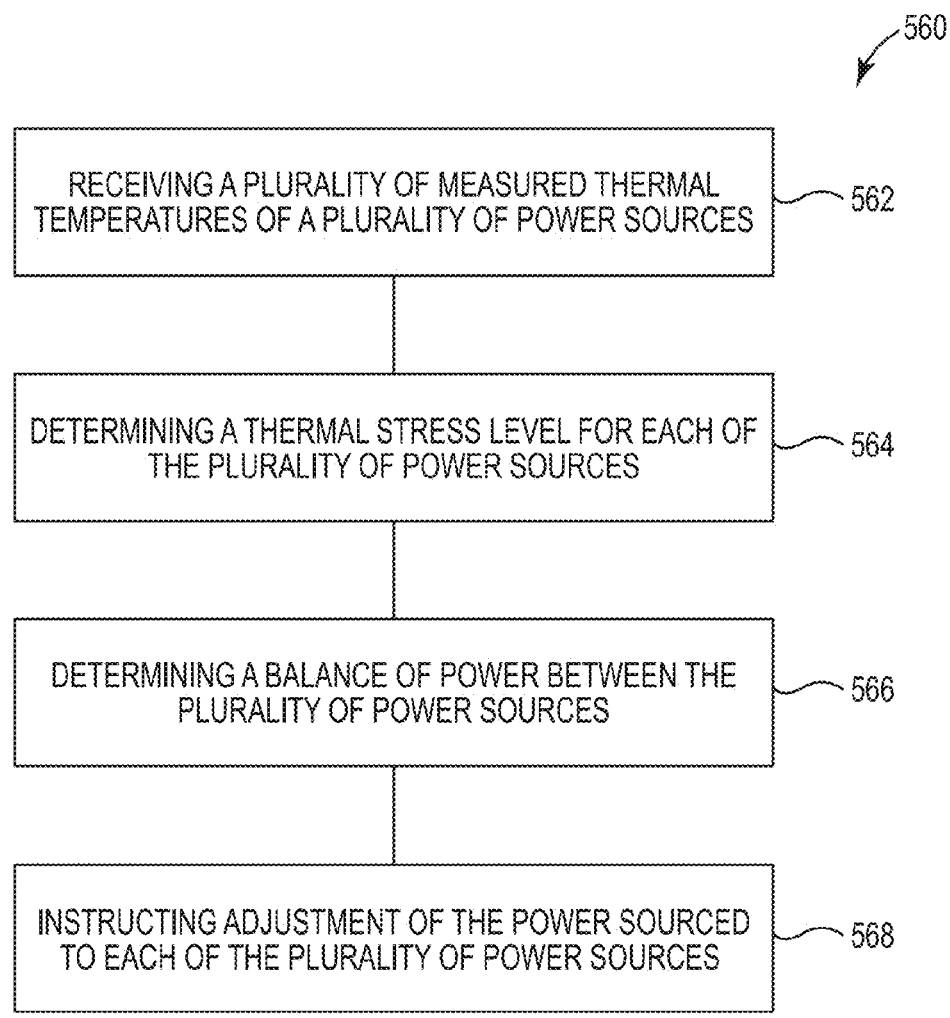
FIG. 5 illustrates a flow chart of an example of a method for power source adjustment according to the present disclosure.

FIG. 5 illustrates a flow chart of an example of a method 560 for power source adjustment according to the present disclosure. Method 560 can be performed using a controller, for instance.

At 562, method 560 can include receiving a plurality of measured thermal temperatures of a plurality of power sources wired in parallel. The plurality of measured thermal temperatures can be received from a sensing device in some examples. For instance, sensing devices (e.g., sensors) located in or on each of the plurality of power source can measure thermal temperatures of components on the power source, thermal temperatures of air entering each of the plurality of power sources, thermal temperatures of heat sinks associated with each of the plurality of power sources, an amount of power sourced by each of the plurality of power sources, thermal temperatures of air exiting each of the plurality of power sources, and/or a combination of two or more of the measurements.

At 564, method 560 can include determining a thermal stress level for each of the plurality of power sources based on the plurality of measured thermal temperatures. A thermal stress level may be an indication of whether a power source needs a reduction in the amount of power it is currently sourcing. For instance, a high thermal stress level may indicate the power source should be sourcing less power.

At 566, method 560 can include determining, responsive to a difference between at least two of the plurality of thermal stresses, a balance of power between the plurality of power sources based on the plurality of thermal stresses. The balance of power can include how much power should be sourced by each of the plurality of power sources in order to meet desired (e.g., threshold) thermal stress levels, power capacities, and/or power margins for the plurality of power sources and/or the system as a whole.

At 568, method 560 can include instructing adjustment of the power sourced to each of the plurality of power sources based on the determined balance. In some instances, the adjustment can be dynamic. The controller can instruct a circuit to perform the adjustment of the power sourced to each of the plurality of power sources. Adjustment of the power sourced can include dynamically adjusting the power until a difference between a first thermal stress associated with a first one of the plurality of power sources and a second thermal stress associated with a second one of the plurality of power sources is within a particular threshold.

Additionally or alternatively, adjustment of the power sourced can include increasing the power sourced to a first one of the plurality of power sources in response to a decrease in a thermal stress level of the first one of the plurality of power sources and/or decreasing the power sourced to a first one of the plurality of power sources in response to an increase in a thermal stress level of the second one of the plurality of power sources.

In some instances, adjustment of the power sourced can include dynamically shifting a droop curve associated with each of the plurality of power sources to rebalance the power sourced to each of the plurality of power sources.

In the preceding detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed:

1. A system for power source adjustment, comprising:
   a sensing device to measure a first thermal temperature of a first power source and second thermal temperature of a second power source;
   a controller to determine a thermal stress level for each of the first power source and the second power source based on the first thermal temperature and the second thermal temperature and to balance power sourced by each of the first and the second power sources based on the thermal stress levels; and
   a circuit to adjust the power sourced by each of the first and the second power sources based on the balanced sourced power.

2. The system of claim 1, wherein the first power source and the second power source are wired in parallel.

3. The system of claim 1, wherein the first and the second thermal temperatures include at least one of an exhaust temperature, an inlet temperature, a heat sink temperature, an amount of power sourced, and a component temperature.

4. The system of claim 1, wherein the first thermal temperature includes a combination of an exhaust temperature, an inlet temperature, a heat sink temperature, an amount of power sourced, and a component temperature of the first power source, and the second thermal temperatures includes a combination an exhaust temperature, an inlet temperature, a heat sink temperature, an amount of power sourced and a component temperature of the second power source.

5. The system of claim 1, wherein the system is an active power sharing system.

6. The system of claim 5, the circuit to adjust the power sourced by applying an offset potential to each of the first and the second power sources based on the balanced power.

7. The system of claim 1, wherein the system is a droop-based power sharing system.

8. The system of claim 7, the circuit to adjust the power sourced by shifting a droop curve associated with each of the first and the second power sources based on the balanced power.

9. A system for power source adjustment, comprising:
   a first sensing device to measure a first thermal temperature of a first power source;

a second sensing device to measure a second thermal temperature of a second power source, the second power source wired in parallel to the first power source;

a controller to:
  receive from the first sensing device a first signal associated with the first thermal temperature;
  receive from the second sensing device a second signal associated with the second thermal temperature; and
  generate a first response signal associated with the first power source and a second response signal associated with the second power source in response to the received first and second signals, the first response signal including information associated with thermal stress level of the first power source and the second response signal including information associated with the thermal stress level of the second power source; and a circuit to adjust the power sourced by each of the first and the second power sources based on the first and the second response signals.

10. The system of claim 9, wherein:
  the first response signal is proportional to an amount of power the first power source sources, relative to the second power source; and
  the second response signal is proportional to an amount of power the second power source sources, relative to the first power source.

11. A method for power source adjustment, comprising, by a controller:
  receiving a plurality of measured thermal temperatures of a plurality of power sources wired in parallel;
  determining a thermal stress level for each of the plurality of power sources based on the plurality of measured thermal temperatures;
  determining, responsive to a difference between at least two of the plurality of thermal stresses, a balance of power between the plurality of power sources based on the plurality of thermal stresses; and
  instructing adjustment of the power sourced to each of the plurality of power sources based on the determined balance.

12. The method of claim 11, wherein adjustment of the power sourced includes dynamically adjusting the power until a difference between a first thermal stress associated with a first one of the plurality of power sources and a second thermal stress associated with a second one of the plurality of power sources is within a particular threshold.

13. The method of claim 11, wherein adjustment of the power sourced includes:
  increasing the power sourced to a first one of the plurality of power sources in response to a decrease in a thermal stress level of the first one of the plurality of power sources; and
  decreasing the power sourced to a first one of the plurality of power sources in response to an increase in a thermal stress level of the second one of the plurality of power sources.

14. The method of claim 11, wherein adjustment of the power sourced includes dynamically shifting a droop curve associated with each of the plurality of power sources to rebalance the power sourced to each of the plurality of power sources.

15. The method of claim 11, wherein the plurality of measured thermal temperatures are received from a sensing device.

16. The method of claim 11, wherein the controller instructs a circuit to perform the adjustment of the power sourced to each of the plurality of power sources.

* * * * *